United States Patent
Sahay

(10) Patent No.: US 7,708,847 B2
(45) Date of Patent: May 4, 2010

(54) GYPSUM BASED PANEL AND METHOD FOR MAKING GYPSUM BASED PANEL

(75) Inventor: Parnika Sahay, Selby (GB)

(73) Assignee: BPB plc, London (GB)

( * ) Notice: Subject to any disclaimer, the term of this patent is extended or adjusted under 35 U.S.C. 154(b) by 58 days.

(21) Appl. No.: 11/423,541

(22) Filed: Jun. 12, 2006

(65) Prior Publication Data

US 2007/0284027 A1    Dec. 13, 2007

(51) Int. Cl.
| | |
|---|---|
| B29C 65/00 | (2006.01) |
| B32B 13/00 | (2006.01) |
| B32B 37/00 | (2006.01) |
| B32B 23/04 | (2006.01) |
| B32B 29/00 | (2006.01) |

(52) U.S. Cl. .................................. 156/39; 428/532
(58) Field of Classification Search .................. 156/39; 428/532
See application file for complete search history.

(56) References Cited

U.S. PATENT DOCUMENTS

| | | | |
|---|---|---|---|
| 2,207,339 A | 7/1940 | Camp | |
| 3,989,534 A | 11/1976 | Plunguian et al. | |
| 4,051,291 A | 9/1977 | Long | |
| 4,117,183 A | 9/1978 | Long | |
| 4,119,752 A | 10/1978 | Long | |
| 4,169,747 A | 10/1979 | De Rooy et al. | |
| 5,879,825 A | 3/1999 | Burke et al. | |
| 5,922,447 A | 7/1999 | Baig | |
| 6,251,979 B1 | 6/2001 | Luongo | |
| 6,319,312 B1 | 11/2001 | Luongo | |
| 6,340,388 B1 | 1/2002 | Luongo | |
| 6,391,958 B1 | 5/2002 | Luongo | |
| 6,403,688 B1 | 6/2002 | Luongo | |
| 6,783,587 B2 * | 8/2004 | Sethuraman et al. ........ 106/674 |
| 6,841,232 B2 | 1/2005 | Tagge et al. | |
| 2003/0084980 A1 | 5/2003 | Seufert et al. | |
| 2003/0092784 A1 | 5/2003 | Tagge et al. | |
| 2004/0092624 A1 | 5/2004 | Tagge et al. | |
| 2004/0092625 A1 | 5/2004 | Pollock et al. | |
| 2005/0126437 A1 | 6/2005 | Tagge et al. | |

FOREIGN PATENT DOCUMENTS

| | | |
|---|---|---|
| DE | A-3246534 | 6/1984 |
| FR | A-1412596 | 10/1965 |
| JP | B-72-051086 | 12/1972 |
| WO | WO 97/35888 | 10/1997 |
| WO | WO 99/08978 | 2/1999 |
| WO | WO 02/12141 | 2/2002 |

OTHER PUBLICATIONS

"Starch" http://web.archive.org/web/20041207005014/http://www.lsbu.ac.uk/water/hysta.html.*

* cited by examiner

*Primary Examiner*—Philip C Tucker
*Assistant Examiner*—Michael N Orlando
(74) *Attorney, Agent, or Firm*—Cook Alex Ltd.

(57) ABSTRACT

A method of forming a gypsum-based panel product including the steps of: mixing calcined gypsum, water, a foaming agent and a core strengthening agent to form a foamed slurry; depositing the slurry; shaping the slurry to form a board having a core and core surfaces, optionally sandwiched between sheets of liner; and allowing the core to set, and drying the board, wherein the strengthening agent is dextrin, used in an amount not less than 0.1% by weight, based on the amount of calcined gypsum, so that, after drying, there is provided a strengthening dispersion of dextrin throughout the core. Less than 5% dextrin in preferred.

26 Claims, 3 Drawing Sheets

GYPSUM BASED PANEL AND METHOD FOR MAKING GYPSUM BASED PANEL

BACKGROUND TO THE INVENTION

1. Field of the Invention

The present invention relates to a gypsum-based panel such as plasterboard, for example, and a method for making such a gypsum-based panel.

2. Related Art

Plasterboard is well known for its uses in the construction industry. It may be used in interior wall and ceiling construction. Its main advantages over more traditional materials are its low manufacturing cost, low installation cost and fire retardance.

Plasterboard typically has a gypsum-based core sandwiched between two sheets of liner paper. However, it is possible to form a similar product using different liners, or with no liners. For this reason, the more general term "gypsum-based panel" is used herein. It is to be understood that plasterboard is one class of gypsum-based panel.

Plasterboard is typically formed in a continuous process in which a slurry is provided by mixing dry ingredients with water and a foaming agent. Mixing techniques for providing the slurry vary by region, but generally the slurry is mixed and then continuously deposited between two continuously supplied sheets of liner paper. One of the sheets of liner paper (typically the face paper) is folded and bonded to the other sheet of liner paper (typically the backing paper). The product of this process is pressed to the required thickness by a forming plate. The slurry is then allowed to set between the two liner paper sheets. The continuously-produced board is then cut into panels of a predetermined length which are then dried in kilns to remove excess water.

Typically, the dry ingredients of the slurry include calcium sulphate hemihydrate ($CaSO_4.0.5H_2O$), also known as calcined gypsum, acid-modified starch for promoting the bond between the liner paper and the core, and optional other additives. These are mixed with water and foam or a foaming agent. The purpose of the foam is to include voids in the slurry in order to reduce the density of the set core of the plasterboard.

The calcined gypsum undergoes a hydration reaction in the presence of water to form calcium sulphate dihydrate ($CaSO_4.2H_2O$), or gypsum. Needle-like crystals of gypsum form and it is the resultant network of these crystals that lends the finished product the basis for the compressive strength of the core.

The acid modified (thinned) starch added to the slurry promotes the adhesion of the liner paper to the core. It is believed that the acid modified starch migrates with water during the board manufacturing process to the paper-core interface to promote adhesion, as explained in U.S. Pat. No. 2,207,339, in which an acid modified starch is prepared by modifying raw starch using dilute nitric acid.

It is also known to apply starches directly to the liner paper, to improve adhesion of the liner paper to the core. See, for example, U.S. Pat. No. 4,051,291, U.S. Pat. No. 4,117,183, U.S. Pat. No. 4,119,752.

WO 02/12141 discloses the use of starch in plasterboard and explains that the starch migrates to the core-paper interface to help the liner paper bind to the core.

U.S. Pat. No. 3,989,534 suggests that a film former may be added to a gypsum slurry in order to improve the stability of a foam introduced into the slurry to reduce the final density of the product. Suitable film formers are cold-water soluble organic compounds such as pregelatinized starch, guar gum or xanthan gum.

FR-A-1412596 discloses the use of dextrins (a form of starch) in jointing compounds for use with prefabricated gypsum boards. Similarly AU 9221039 discloses the use of a combination of PVA, methyl cellulose and yellow dextrin (see below) in a jointing composition.

U.S. Pat. No. 4,169,747 discloses an accelerator composition for plasterboard, the accelerator comprising finely ground hydrated gypsum and an additive for preserving the gypsum from calcination. The additive may be lignosulfate, starch, dextrin or sucrose.

U.S. Pat. No. 6,251,979, U.S. Pat. No. 6,340,388, U.S. Pat. No. 6,391,958 and U.S. Pat. No. 6,403,688 briefly discuss the use of starches or dextrins as an adhesive agent to promote the bonding of liner paper to the core in plasterboard.

DE-A-3246534 also disclose the use of adhesives in wallboard manufacture, the adhesive acting to adhere the core to the liner paper, and being one of starch, dextrin or synthetic resin. JP-B-72-051086 contains similar disclosure.

WO 97/35888 discloses methods for starch degradation, for use in wallboard.

U.S. Pat. No. 6,319,312 discloses a plasterboard formulation including an expanded mineral such as perlite in order to reduce the amount of gypsum required. The formulation requires a combination of synthetic binders that form a crosslinked network in the plasterboard. The combination of synthetic binders is a vinyl acetate emulsion in the form of poly(vinyl acetate) particles in polyvinyl alcohol and water, a source of boron (e.g. borax) and starch. It is suggested that the starch could be dextrin, although this is not exemplified. The use of perlite (in effect, a lightweight aggregate) in the board required the use of the synthetic binders in order to bond the core. Failure to use the synthetic binders would likely have led to a core with unsuitably low strength. It has been found that the formulation exemplified in U.S. Pat. No. 6,319,312 is not effective in providing a suitable plasterboard structure, for reasons that are not well understood at this time. Furthermore, it is not preferred to use synthetic binders such as PVA in plasterboard made using normal foamed gypsum slurry, since the synthetic binder is not cost-effective for large-scale industrial plasterboard manufacture.

WO 99/08978 discloses the addition of trimetaphosphate ions to a plasterboard slurry, to provide an increase in strength of the core. In addition, that document discloses that the typical use of a nonpregelatinized starch (e.g. an acid modified starch) to promote the paper-core bond may not be sufficient to prevent weakening of that bond when the board becomes wet. Thus, as well as the use of trimetaphosphate ion, WO 99/08978 discloses the addition of pregelatinized starch to the slurry. The result of this is that the weakening of the paper-core bond is reduced. The mechanism for this beneficial effect is not explained in WO 99/08978, but it is observed that the pregelatinized starch becomes distributed throughout the core. Raw starch is pregelatinized by cooking in water at temperatures of at least 185° F. (about 85° C.). The pregelatinized starch is included in the slurry in an amount between 0.08-0.5% by weight, based on the weight of gypsum.

U.S. Pat. No. 5,922,447 discloses the uses of a partially cooked starch in wallboard. The wallboard core contained both gypsum and perlite. The starch binds the gypsum particles and perlite spheres and does not tend to migrate to the paper-core interface. The starch is partially cooked in water at temperatures between 150° F. and 185° F. (between about 65° C. and about 85° C.). The starch used is pearl starch (in this case a combination of starch made from corn, potato and/or wheat stock), although acid-modified starches are also suggested.

One measure of the core strength of plasterboard is nail pull resistance. Methods for testing the nail pull resistance of plasterboard are set out in ASTM C473-03 (Standard Test Methods for Physical Testing of Gypsum Panel Products). Ideally, for many applications, plasterboard should have a low density (usually referred to by the weight per area for a particular board thickness, e.g. pounds per thousand square feet (lb/MSF)) and a high nail pull resistance.

U.S. Pat. No. 6,783,587 discloses a plasterboard in which starch is added in an amount between 1.5-3.0% by weight, based on the amount of gypsum, in order to increase the nail pull resistance of the board. The starch used is acid modified starch, of the type typically used to promote binding of the liner paper to the core.

US-A-2003/0084980 discloses a plasterboard formulation including acid-modified starch and a starch crosslinking agent (e.g. type N hydrated lime). The cross-linking agent is believed to lock some of the starch in the core, the remainder migrating to the paper-core interface to promote bonding.

US-A-2003/0092784 discloses a polymer-reinforced gypsum material, the polymer being crosslinked in situ. The polymer used is a synthetic polymer such as PVP (poly(vinyl pyrrolidone)) and the crosslinking component is PSS (poly(sodium 4-styrene sulfonate)).

U.S. Pat. No. 5,879,825 discloses the addition of an acrylic polymer composition, having a glass transition temperature of 15° C. or greater, to plasterboard in order to increase the core strength of the plasterboard.

US-A-2004/0092625, US-A-2004/0092624 and U.S. Pat. No. 6,841,232 disclose a gypsum based composite structure such as plasterboard with a cellulose ether additive (other than carboxymethylecellulose (CMC)), in order to improve nail pull resistance and flexural strength.

US-A-2005/0126437 discloses a wallboard core composition including a substituted starch. The properties of the starch (degree of substitution, degree of polymerization and viscosity) are selected so that the starch does not dissolve in water at the slurry mixing temperature, but does dissolve at higher temperatures. In this way, excessive migration of the starch to the core-paper interface is avoided.

SUMMARY OF THE INVENTION

Of paramount importance in the industrial production of gypsum-based panel products is the cost of the starting materials, as well as the efficiency of the manufacturing process. Due to the very high volume nature of gypsum-based panel products manufacture, even a small efficiency saving or a change in starting materials can result in very significant overall savings in production costs.

The present inventors have realised that it is possible to utilize dextrin as a core strength-enhancing agent in the manufacture of gypsum-based panel products, with the unexpected result that the nail pull resistance and/or other strength-related properties of the gypsum-based panel products can be improved. Additionally or alternatively, the panel can be made more lightweight, whilst providing the same or improved nail pull resistance and/or other strength-related properties of the panel.

In a first aspect, the present invention provides a method of forming a gypsum-based panel product including the steps of:
mixing calcined gypsum, water, a foaming agent and a core strengthening agent to form a foamed slurry depositing the slurry
shaping the slurry to form a panel having a core and core surfaces, optionally sandwiched between sheets of liner allowing the core to set, and drying the panel wherein the strengthening agent is dextrin, used in an amount not less than 0.1% by weight, based on the amount of calcined gypsum, so that, after drying, there is provided a strengthening dispersion of dextrin throughout the core.

Preferably, the dextrin used as the core strengthening agent is formed by thermal degradation.

Preferably, the strengthening agent is used in an amount not less than 0.3% by weight, based on the amount of calcined gypsum, preferably not less than 0.4%, 0.5% or 0.6% by weight, based on the amount of gypsum. There may be used 5% or less, or more preferably 3% or less, 2% or less, 1.5% or less, 1.2% or less or 1.0% or less core strengthening agent, by weight based on the amount of calcined gypsum.

Preferably, the resultant gypsum-based panel product has a nail pull resistance at least 2% (more preferably at least 4% or most preferably at least 6%) greater than that of a panel formed by the same method but without the strengthening agent. It is considered, without being limited to this consideration, that the inclusion of dextrin in the core of the finished product provides additional strength to the core by the formation of a percolating film of dextrin through the core.

Preferably, the resultant panel has a core compressive strength not less than that of a panel formed by the same method but without the strengthening agent.

The moisture content of the dextrin at the time of adding to the slurry is preferably 5% or more. The moisture content of the dextrin at the time of adding to the slurry may be 12% or less. Most preferably, the dextrin added to the slurry is white dextrin. Alternatively, the dextrin added to the slurry is yellow dextrin.

The dextrin may be non-pregelatinized. However, preferably the dextrin is pregelatinized.

Preferably, the dextrin is derived from one of corn, wheat, tapioca, potato, rice and sago.

The dextrin may be added to the slurry in the form of granules (e.g. for non-pregelatinized dextrin) or powder (e.g. for pregelatinized dextrin).

The dextrin may have a composition in which the amount of amylopectin, based on the total amount of dextrin, is more than 70%, preferably about 80%. The amount of amylose is preferably less than 30%, preferably less than 20%, based on the total amount of dextrin.

Preferably, a liner (most preferably a liner paper) is applied to at least one of the core surfaces (and preferably a liner paper is also applied to the other core surface) and the resultant plasterboard has a liner-core bond strength not less than that of a plasterboard formed by the same method but without the strengthening agent.

Preferably, a paper-core bonding agent is added to the slurry, the paper-core bonding agent being different to the strengthening agent. In use, the paper-core bonding agent may migrate towards the paper-core interface during processing of the plasterboard to a greater extend than the core strengthening agent. However, it has been found that dextrin itself can provide a suitable paper-core bond. Accordingly, the paper-core bonding agent may be dextrin.

Preferably, the paper-core bonding agent is an acid-modified or oxidised starch. The paper-core bonding agent may be added to the slurry in an amount not less than 0.1% by weight, based on the amount of gypsum. The paper-core bonding agent may be added to the slurry in an amount not more than 1% by weight, based on the amount of gypsum. More preferably, the paper-core bonding agent is added to the slurry in an amount not more than 0.7% by weight (most preferably not more than 0.5% by weight), based on the amount of gypsum.

Preferably, the sum of the amount of paper-core bonding agent and core strengthening agent is less than 1.5% by weight, based on the amount of gypsum.

Preferably, the paper-core bonding agent is substantially not soluble in water at the mixing temperature of the slurry. Preferably, the paper-core bonding agent is at least partially soluble in water at the drying temperature of the slurry.

Typically, the panel is produced in a continuous process, the slurry being deposited onto a moving conveyor.

In a second aspect, the present invention provides a gypsum-based panel product having a core comprising at least partially hydrated calcined gypsum and a strengthening agent, the core having voids formed therein, the core optionally being sandwiched between sheets of liner, wherein the strengthening agent is dextrin, used in an amount not less than 0.1% by weight, based on the amount of calcined gypsum, the dextrin being distributed in the core so that there is provided a strengthening dispersion of dextrin throughout the core.

Preferably, the panel comprises not less than 0.3% by weight of strengthening agent, based on the amount of calcined gypsum, preferably not less than 0.4%, 0.5% or 0.6% by weight, based on the amount of gypsum. The panel may comprise 5% or less, or more preferably 3% or less, 2% or less, 1.5% or less, 1.2% or less or 1.0% or less core strengthening agent, by weight based on the amount of calcined gypsum.

The panel may have a liner (preferably a liner paper) applied to at least one of the core surfaces (and preferably a liner is also applied to the other core surface) to form plasterboard. In this case, the plasterboard may further comprise a paper-core bonding agent, the paper-core bonding agent being different to the strengthening agent. The paper-core bonding agent may be an acid-modified starch. Preferably, the paper-core bonding agent is present in the plasterboard in an amount not less than 0.1% by weight and not more than 1% by weight, based on the amount of gypsum. Typically, the sum of the amount of paper-core bonding agent and core strengthening agent is less than 1.5% by weight, based on the amount of gypsum.

The panel may be considered to have a notional centre line, equispaced between the surfaces of the board. A central region in the panel may be defined as follows:
a band extending to two thirds of the thickness of the core and centred on the centre line.
Peripheral regions of the panel may be defined as follows:
a first peripheral region of the panel being defined in a band extending parallel to and incorporating one panel surface and being 10% of the thickness of the panel;
a second peripheral region of the panel, at the opposite side of the panel from the first peripheral region, said second peripheral region being defined in a band extending parallel to and incorporating the other panel surface and being 10% of the thickness of the panel.

Preferably, of the total amount of dextrin detectable in a cross section of the finished product, at least 50% is located in said central region of the core.

Preferably, at least 50% (and more preferably at least 75%) of the total amount of paper-core bonding agent present in the board is located in the first and second peripheral regions of the board.

Preferably, the panel does not include synthetic binder. In particular, preferably the panel does not include polyvinyl acetate particles, e.g. a vinyl acetate emulsion. One reason for this is that synthetic binders are typically considerable more expensive than polymers derived from plants or the like. Of course, trace amounts of such materials may inadvertently occur in the panel, but preferably such trace amounts are less than 0.5% by weight, based on the amount of calcined gypsum and preferably significantly lower than this (e.g. less than 0.1% by weight).

Furthermore, the panel preferably does not include an expanded mineral filler material such as perlite. It is preferred instead to generate a foam for the slurry so that voids are formed in the finished panel as a result of the foam.

DETAILED DESCRIPTION OF THE PREFERRED EMBODIMENTS

Figure 1:
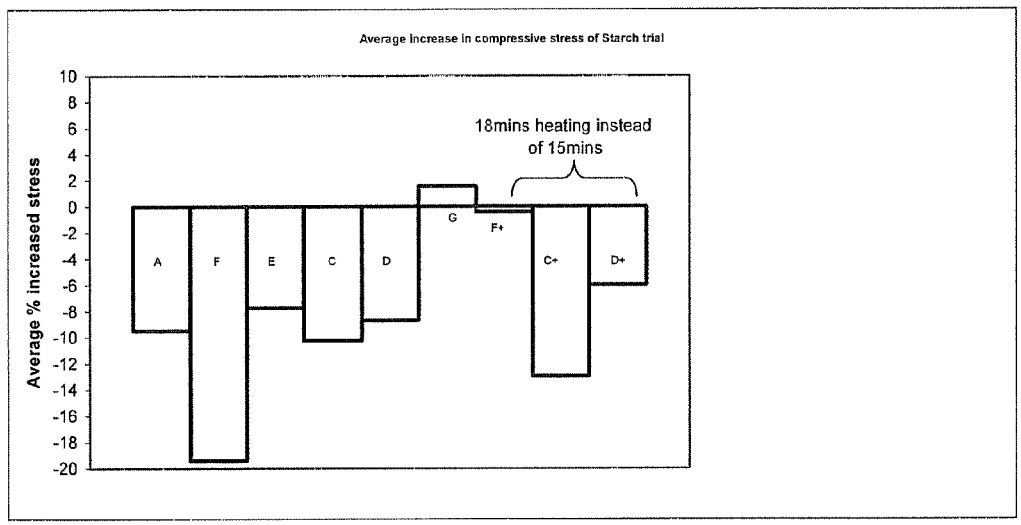
FIG. 1 shows a bar chart of the average change of compressive strength of gypsum prismatic blocks containing different starch-based strengthening agents, compared to a control sample.

As mentioned above, starch can be used in the plasterboard industry to produce a bond between the two paper liners that the gypsum core is sandwiched between. The use of this natural polymer is based on its gelling, adhesive, film-forming properties and its low cost.

It is known to modify starches by various methods. Modification by degradation is known. Commercially available degraded starches include acid-modified starches, oxidized starches and dextrins. These are discussed below:

Acid modified starches are manufactured by controlled acid-catalysed hydrolysis of the granular starches in aqueous suspension at temperatures below the gelatinisation temperatures, so that the products can be recovered by filtration, washing and drying. The major reaction involved is hydrolytic breakdown, that is, chain scission at glucoside bond. In acid modification 0.2% $H_2SO_4$ or HCl is used at 50-55° C. for 12-14 hours. In an acid-modified starch the acid attacks the starch in the amorphous areas of the granule more rapidly than the crystalline areas. Initially, the amylopectin in the granule is degraded more rapidly than the amylose. These starches swell a limited amount on heating and the final viscosity reached is a lot lower than that achieved from a native starch. Typically, the paper-core bonding agent added to the slurry for plasterboard is an acid modified starch.

The commercial production of oxidized starches involves treating the aqueous starch suspension with sodium hypochlorite solution at pH 8 to 10 and at a temperature of 21 to 38° C. The hypochlorite oxidizes a limited number of hydroxyl groups to aldehyde, ketone and carboxyl groups with associated cleavage of the glucoside bonds. The reaction is neutralised when the required level of oxidation has been reached. The introduction of carboxyl groups into the linear amylose molecules reduces the tendency to retrograde. Since carboxyl groups are present, the oxidised starches are anionic at a pH above 5 and therefore can be stained by cationic dyes such as methylene blue. Oxidized starches gelatinise at lower temperatures, giving a faster rate of gelatinisation with a lower peak viscosity.

There are four major groups of dextrins: (i) hydrolysed starches with enzymes such as amylases; (ii) degraded products by acid hydrolysis; (iii) Schardinger dextrins, formed from dispersed starch by *Bacillus macerans* transglycolase; (iv) Pyrodextrins, produced by the action of heat alone or in combination with acid on dry, granular starch.

Products (i) and (ii) are generally prepared by the user at the site of application. The Schardinger dextrins are of interest because of their ability to form inclusion complexes with organic molecules but are not presently of major commercial interest.

Pyrodextrins are manufactured in large quantities and are of commercial interest. Three types of chemical transformations take place during the dextrinization process. In the presence of acid and moisture, degradation by hydrolysis takes place. At high temperature and low moisture content, there is rearrangement involving breaking the glucoside linkage at one point in the molecule and reattachment at a different point. At high temperatures in the presence of acid and anhydrous conditions, the small fragments repolymerise to form highly branched molecules. The conditions therefore of the dextrinization determine the properties of the dextrin product. If hydrolysis predominates, then the dextrins will show retrogradation properties. If repolymerisation and rearrangement predominates, then the dextrins will be more stable to retrogradation and more soluble in cold water.

The pyrodextrinization process is carried out in four steps: acidification, predrying, dextrinization and cooling. Dextrinization (hydrolysis and repolymerization) is carried out until the products show the desired characteristics of viscosity and solubility. Dextrinizaton is the roasting of dry starch, mostly in the presence of small quantities of acid. Native starch (10-20% moisture) is mixed with the required quantity of acid (usually hydrochloric acid). The next stage is a drying process to reduce the moisture content of the starch to levels of 5-12% (white dextrins), or below 5% (yellow dextrins). The subsequent dextrinization process is carried out in rotating roasting kilns or in fluidised bed systems. When the reaction is complete the dextrin is dropped into a vessel and cooled. Finally the product is remoistened (to about 10% moisture), sieved and bagged.

EXAMPLES

The effects of various starches on the properties of plasterboard were investigated. In particular, the efficacy of the starches as core reinforcing agents was investigated. Nail pull resistance (according to the standard ASTM C473-03 testing procedure) and compressive strength were measured.

Additionally, the effect on paper-core bond strength was measured. The starches used were:

A Native corn starch—RC03408 (Cerestar Cargill)
B Acid thinned corn starch (control)—Collofilm 120 (Tate and Lyle)
C Native potato starch—C*30002 (Cerestar Cargill)
D Waxy phosphate corn starch—C*06300 (Cerestar Cargill)
E Native waxy corn starch—C*04201 (Cerestar Cargill)
F High amylose starch—C*03003 (Cerestar Cargill)
G Thermally Modified Dextrin—C*Film 07311 (Cerestar Cargill)

Waxy phosphate corn starch and native waxy corn starch have a high amylopectin fraction. As the name suggests, high amylose starch has a high amylose fraction.

Compressive Strength

Prismatic gypsum blocks (with liner paper) were formed using slurry including the various starches tested as core strengthening agents. For each composition, 0.5% strengthening agent (starch) was added. The resultant compressive strength of these blocks is set out in FIG. 1 relative to the average compressive strength of the control samples (using acid thinned corn starch as the core strengthening agent).

Gypsum blocks measuring 20 mm in width, 20 mm in depth and 100 mm in length, were produced for compressive test results. 70 ml of water per 100 g of stucco (calcium sulphate hemihydrate) was mixed together in a high shear blender (Kenwood) for 10 seconds. The different grades of starches to be investigated were dry mixed with the stucco (calcium sulphate hemihydrate) before producing the slurry. The slurry was poured into a rubber mould to fabricate six gypsum blocks measuring 20 mm×20 mm×100 mm. The excess slurry was scraped off the top surface of the moulds with a spatula to produce a flat surface before allowing the slurry to set. The blocks were then removed from the moulds and placed in a custom made rig to hold 6 gypsum blocks together and dried in a 180° C. oven with steam for 15 minutes. The blocks were then dried in a 40° C. oven to constant weight before being conditioned at 23° C. 50% relative humidity for a minimum of 24 hours. For starches C, D and F, additional blocks were made using a modified process, in which the gypsum blocks were dried in a 180° C. oven with steam for 18 minutes. Results for these are indicated in the drawings as C+, D+ and F+. The gypsum blocks were tested in compression using a Zwick Universal Testing Machine. Cubes of side 20 mm of the gypsum blocks were tested under compression by placing a metal (20 mm side) cube on the surface of the gypsum block. A load at a constant rate of 250N/min +/−20% was applied and the peak load of failure measured and recorded. Each grade of starch provided 12 compressive strength results.

Paper-core Bond Strength

Plasterboard samples were manufactured in the laboratory, as follows.

A laboratory continuous mixer was used to produce the samples for testing; it replicates the mixing regime of the board plant by having a similar short residence time and dispersion.

The laboratory continuous mixer disperses the solid constituents (i.e. stucco and core strengthening agent) in the water and foam using a 'C' shaped rotor turning at high speed to form a plaster slurry that exits from a spout mounted on the side of the rotor housing. Slurry is collected in a mould on a plastic sheet with the bottom paper already in place. When the mould is full, the top paper is placed on top; the excess slurry is drawn out leveling the sample and another plastic sheet weighted down on top.

Slurry and resultant board properties were achieved by control of the foam (sodium alcohol ether sulphate) and water flow rate considering the solid constituents feed rate, which was controlled by the hopper lined with vinyl internally to agitate the powder. To ensure the production of a consistent slurry, feed rates for all components should be accurately controlled and measured.

The starch was pre-blended into the bulk of the stucco before each run at the appropriate percentage addition level. GMN accelerator (Ground Mineral Nansa, i.e. ground gypsum dihydrate with surfactant) was also added at 0.3% by weight, based on the amount of stucco, to target a final set time of less than 4 minutes. It is also possible to use HRA (Heat Resistant Accelerator) and BMA (Ball Milled Accelerator). Both of these are ground gypsum dihydrate with sugar to increase shelf life and potency of the accelerator. When a dry additive was being assessed, at least 5-6 kg was required to be dry blended for 20 minutes so the weighing system in the hopper could be balanced.

The following parameters were kept constant throughout:

Water gauge=70 ml/100 g

Stucco feed rate=60 kg/hr

Mixing water temperature=40° C.

A stainless steel lined experimental dryer having a temperature range of Ambient—350° C., a constant humidity and high airflow was used to dry the samples in conditions similar to a typical plasterboard manufacturing plant dryer.

The samples were allowed to hydrate at ambient temperature for 13 minutes before being placed in the 180° C. drying oven for 15 minutes. (Again, some samples were heated at 180° C. in this step for 18 minutes, and a denoted by a + suffix.) The samples were then placed in a 60° C. oven for a minimum of 12 hours to remove any remaining moisture in the board. The boards were then transferred to an oven set at 40° C. prior to being conditioned at 23° C./50% RH, re-weighed, thickness measured and tested.

In each production run, the following samples were made:

150 mm×150 mm samples (×2) for nail pull testing according to the ASTM C473-03 Standard Test Methods for Physical Testing of Gypsum Panel Products. The board thickness is 12.7 mm or ½ inch to emulate standard board production on-line.

The amount of core strengthening agent added for each board type is shown in Tables 1 and 2.

The boards were also tested for paper-core bond strength. The bond strength measurements were carried out at 20° C. and at 90% relative humidity. The qualitative results are shown in Table 1. Where appropriate, the results are shown for the compositions that were subjected to a longer heating step of 18 minutes.

TABLE 1

| Additive | Addition level % | Comments |
| --- | --- | --- |
| B (control) | 0.5 | Good paper core bond |
| A | 0.5 | Good paper core bond |
| C | 0.5 | Poor paper core bond |
| F+ | 0.5 | Average paper core bond |
| E | 0.5 | Poor paper core bond |
| D+ | 0.5 | Good paper core bond |
| G | 0.5 | Good paper core bond |

Figure 2:
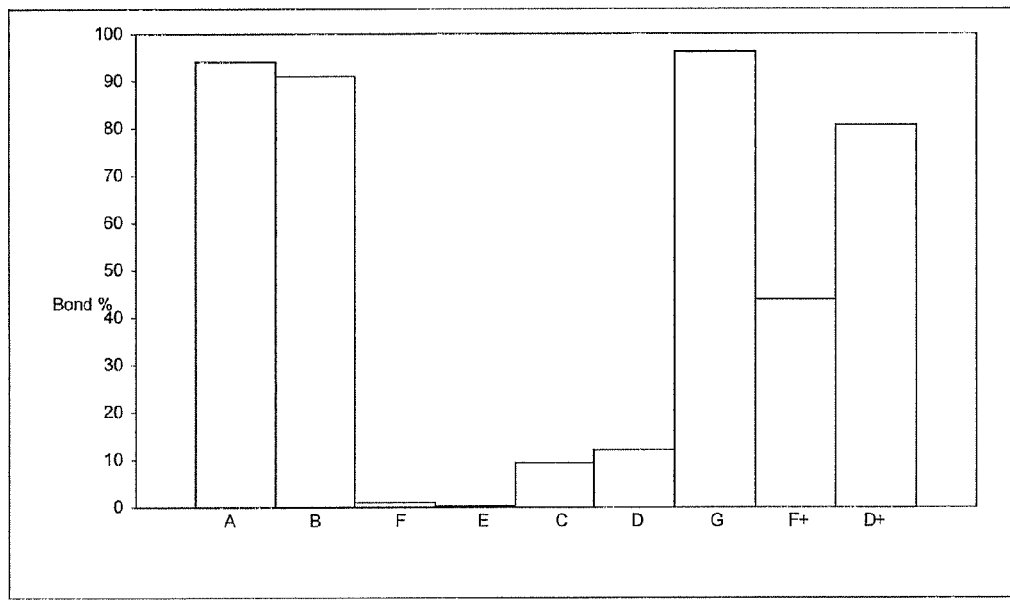
FIG. 2 shows a bar chart of the change in paper-core bond strength of gypsum prismatic blocks containing different starch-based strengthening agents, compared to a control sample.

The numerical results are shown in the bar chart of FIG. 2.

Board samples were conditioned at 20 C and 90% relative humidity for 3 hours. Using a utility knife, a figure 'X' was cut into the face side of the board at several locations across the width. The paper was peeled away from the core.

The percentage face bond was determined as the area covered by paper plies. The procedure was repeated for the back side of the board. 100% bond would indicate no exposure of the gypsum core. Full exposure of the gypsum core would indicate 0% bond.

Nail Pull Resistance

Nail pull resistance for each board was tested in accordance with the ASTM standard. The results are shown in Table 2 and in FIG. 3.

TABLE 2

| Starch Type | % Addition level | % Nail Pull |
| --- | --- | --- |
| B (control) | 0.50 | 0 |
| D | 1.75 | Decreased 5% |
| G | 1.75 | Increase 20% |
| A | 1.75 | No change |
| C | 1.75 | Decrease 11% |
| E | 1.75 | Decrease 4% |

Figure 3:
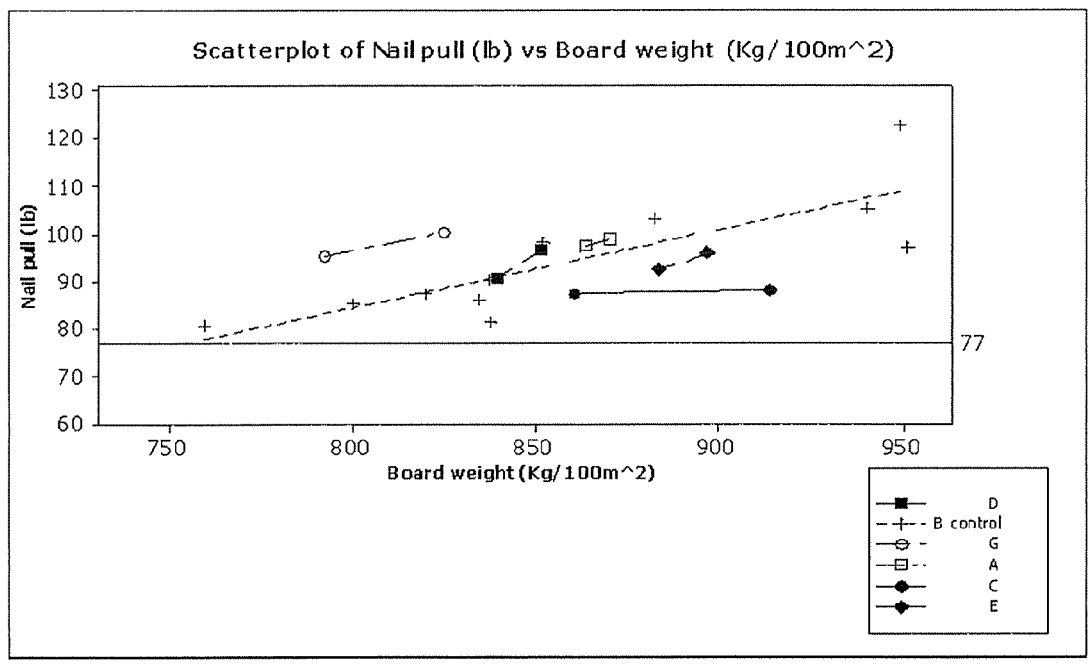
FIG. 3 shows a scatter plot of nail pull resistance of laboratory-made plasterboard containing different starch-based strengthening agents.

As shown in the scatter plot of FIG. 3, the nail pull resistance of boards manufactured using dextrin as the core strengthening agent was significantly higher than that of the control boards, and significantly higher than that of the board manufactured with the same amounts of alternative starches as potential core strengthening agents.

In Table 2, the % nail pull increase is calculated by taking the average change in nail pull strength for each class of samples with respect to the best-fit line for the control samples (shown as a dotted line in FIG. 3).

Using the results shown in FIG. 3 and Table 2, dextrin was selected as the most suitable strengthening agent to be tested in a full plant trial. Dextrin was added supplemental to acid thinned corn starch, and the nail pull resistances of the standard board (using only acid thinned corn starch) and the dextrin boards were compared. The result was an 8% increase in nail pull for a board containing 0.5% dextrin and 0.5% acid thinned corn starch compared to 0.5% acid thinned corn starch alone (control). So, even at a supplementary amount of dextrin of only 0.5 wt % (based on the amount of calcined gypsum (stucco)), a significant increase in nail pull resistance is seen.

From the selection of starches investigated, it was determined that the dextrinized starch was most beneficial to core strength of plasterboard. The dextrinized starch, which effected an improvement in the board's mechanical properties, was corn-based white dextrin starch. It enhanced nail pull properties of plasterboard by up to 20% compared to standard plasterboard. At the addition levels of dextrin added in the process, 0.5 wt % of stucco, no detrimental impact was seen. Good quality boards were produced with good score and snap, and good mechanical properties, and enhanced nail pull resistance.

The level of dispersion throughout the core of the plasterboard can also determine the performance of the starch. Uniform dispersion of the starch results in enhancement of strength of the plasterboard. With the aid of iodine staining, it can be determined that dextrin that has gelatinized and dispersed uniformly within the core provides an increase in nail pull resistance for the board. A darker stain represents a greater percentage of dextrin (or other starch) gelatinization. These results are illustrated by FIG. 4, each sectioned plasterboard sample being labelled as previously.

Figure 4:
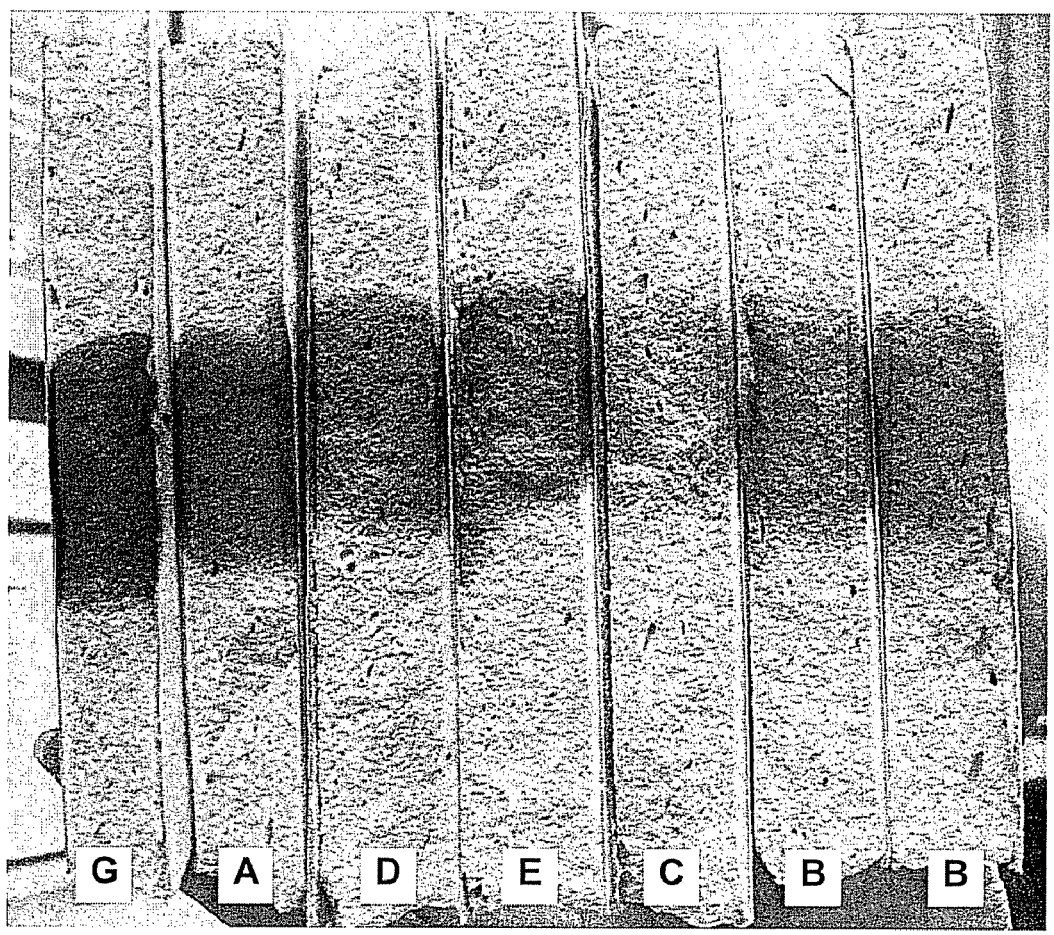
FIG. 4 is a photograph illustrating the difference in response to iodine staining of plasterboard cores containing different starch-based strengthening agents.

In FIG. 4, the lightness of the iodine stained area of plasterboard is represented by the greyscale value of the image (0=black and 255=white) The greyscale values were determined by analysing the photograph shown in FIG. 4, in digital form on a PC using the software Paint Shop Pro 5. These values are shown in Table 3 below:

TABLE 3

| Starch type | Greyscale Value | Core Strength Change | Nail Pull % Increase |
| --- | --- | --- | --- |
| G | 98 | Good | +20 |
| A | 105 | ↓ | No change (control) |
| B | 105 | | |
| D | 121 | | −5 |
| E | 128 | | −4 |
| C | 158 | Bad | −11 |

FIG. 4 and Table 3 demonstrate that the darker the stain, the greater the nail pull strength enhancement seen. The lower the greyscale number the darker the stain, representing a fully gelatinised, uniformly distributed starch within the core.

It is possible experimentally to determine the amount of dextrin contained in a particular region of the core. In a standard 12.7 mm board, firstly the liner is removed. The remainder of the gypsum board is sectioned into three parts, 2 mm, 8 mm and 2 mm, the cutting of the sections being parallel to the centre plane of the board. The 2 mm sections represent the interface of the gypsum panel and the 8 mm section represents the central region of the core.

An enzymatic reaction can be used on the board samples to determine the total quantity of starch present in each of these samples. An amyloglucosidase/α-amylase method allows the measurement of total starch within the sample. Starch hydrolysis proceeds in two phases. In phase I, the starch is hydrolysed and totally solubilised with the use of α-amylase. In phase II, the soluble starch is quantitatively hydrolysed to glucose by amyloglucosidase.

For most samples, complete solubilisation of starch can be achieved by cooking the sample in the presence of thermostable α-amylase. However, for samples containing high levels of resistant starch (e.g. high amylose maize starch), complete solubilisation requires pre-treatment with dimethyl sulphoxide (DMSO) at 100° C.

After phase II is complete, samples containing high levels of glucose and maltodextrins are then washed with aqueous ethanol before analysis. The analysis involves quantitative measurement of the levels of glucose and maltodextrins present in the sample. An accuracy of +/−2% is achievable. This analysis is carried out according to the Megazyme amyloglucosidase/α-amylase method complying to the AOAC Method 996.11.

Preferred embodiments of the invention have been described by way of example. Modifications of these embodiments, further embodiments and modifications thereof will be apparent to the skilled person on reading this disclosure and as such are within the scope of the invention.

The invention claimed is:

1. A method of forming a gypsum-based panel product including the steps of:
   mixing calcined gypsum, water, a foaming agent and a core strengthening agent to form a foamed slurry;
   depositing the slurry;
   shaping the slurry to form a board having a core and core surfaces, optionally sandwiched between sheets of liner; and
   allowing the core to set, and drying the board, wherein the strengthening agent is non-pregelatinized dextrin formed by thermal degradation, used in an amount not less than 0.1% by weight, and in an amount not more than 1.2% by weight, based on the amount of calcined gypsum, so that, after drying, there is provided a strengthening dispersion of dextrin throughout the core.

2. A method according to claim 1 wherein the strengthening agent is used in an amount not less than 0.3% by weight, based on the amount of calcined gypsum.

3. A method according to claim 1, wherein the resultant panel has a nail pull resistance at least 4% greater than that of a panel formed by the same method but without the strengthening agent.

4. A method according to claim 1, wherein the resultant panel has a nail pull resistance at least 6% greater than that of a panel formed by the same method but without the strengthening agent.

5. A method according to claim 3, wherein the resultant panel has a core compressive strength not less than that of a panel formed by the same method but without the strengthening agent.

6. A method according to claim 1 wherein the dextrin is derived from one of corn, wheat, tapioca, potato, rice, sago and sow gum.

7. A method according to claim 1 wherein the dextrin is added to the slurry in the form of granules.

8. A method according to claim 1 wherein the dextrin has composition in which the amount of amylopectin is 70% or more, based on the total amount of dextrin.

9. A method according to claim 1, wherein a liner is applied to at least one of the core surfaces and the resultant plasterboard has a liner-core bond strength not less than that of a plasterboard formed by the same method but without the strengthening agent.

10. A method according to claim 9 wherein a paper-core bonding agent is added to the slurry, the paper-core bonding agent being different from the strengthening agent.

11. A method according to claim 10 wherein the paper-core bonding agent migrates towards the paper-core interface during processing of the plasterboard to a greater extent than the core strengthening agent.

12. A method according to claim 11 wherein the paper-core bonding agent is an acid-modified or oxidised starch.

13. A method according to claim 10 wherein the paper-core bonding agent is added to the slurry in an amount not less than 0.1% by weight and not more than 1% by weight, based on the amount of gypsum.

14. A method according to claim 13 wherein the paper-core bonding agent is added to the slurry in an amount not more than 0.5% by weight, based on the amount of gypsum.

15. A method according to claim 10 wherein the sum of the amount of paper-core bonding agent and core strengthening agent is less than 1.5% by weight, based on the amount of gypsum.

16. A method according to claim 1 wherein the panel product is produced in a continuous process, the slurry being deposited onto a moving conveyor.

17. A gypsum-based panel product having a core comprising at least partially hydrated calcined gypsum and a strengthening agent, the core having voids formed therein, the core optionally being sandwiched between sheets of liner, wherein the strengthening agent is non-pregelatinized dextrin formed by thermal degradation, used in an amount not less than 0.1% by weight, and in an amount not more than 1.2% by weight, based on the amount of calcined gypsum, the dextrin being distributed in the core so that there is provided a strengthening dispersion of dextrin throughout the core.

18. A gypsum-based panel product according to claim 17 comprising not less than 0.3% by weight of strengthening agent, based on the amount of calcined gypsum.

19. A gypsum-based panel product according to claim 17 having a liner applied to at least one of the core surfaces.

20. A gypsum-based panel product according to claim 19 further comprising a paper-core bonding agent, the paper-core bonding agent being different from the strengthening agent.

21. A gypsum-based panel product according to claim 20 wherein the paper-core bonding agent is an acid-modified or oxidised starch.

22. A gypsum-based panel product according to claim 20 wherein the paper-core bonding agent is present in the plasterboard in an amount not less than 0.1% by weight and not more than 1% by weight, based on the amount of gypsum.

23. A gypsum-based panel product according to claim 20 wherein sum of the amount of paper-core bonding agent and core strengthening agent is less than 1.5% by weight, based on the amount of gypsum.

24. A gypsum-based panel product according to claim 17 wherein the core has a notional centre line, equispaced between the surfaces of the panel, a central region of the panel being defined as a band extending to two thirds of the thickness of the core and centred on the centre line, wherein, of the total amount of dextrin detectable in a cross section of the finished product, at least 50% is located in said central region of the panel.

25. A gypsum-based board product according to claim 24 including a paper-core bonding agent, wherein peripheral regions of the panel are defined as:
 a first peripheral region of the plasterboard being defined in a band extending parallel to and incorporating one board surface and being 10% of the thickness of the board;
 a second peripheral region of the plasterboard, at the opposite side of the plasterboard from the first peripheral region, said second peripheral region being defined in a band extending parallel to and incorporating the other board surface and being 10% of the thickness of the board;
wherein at least 50% of the total amount of paper-core bonding agent present in the board is located in the first and second peripheral regions of the board.

26. A gypsum-based board product according to claim 24 including a paper-core bonding agent, wherein at least 75% of the total amount of paper-core bonding agent present in the board is located in the first and second peripheral regions of the board.

* * * * *

UNITED STATES PATENT AND TRADEMARK OFFICE
CERTIFICATE OF CORRECTION

PATENT NO. : 7,708,847 B2
APPLICATION NO. : 11/423541
DATED : May 4, 2010
INVENTOR(S) : Parnika Sahay It is certified that error appears in the above-identified patent and that said Letters Patent is hereby corrected as shown below:

On the Title Page, Item (73) Assignee reading "BPB plc." should read --BPB Limited--

Signed and Sealed this

Seventeenth Day of August, 2010

David J. Kappos
*Director of the United States Patent and Trademark Office*